(12) United States Patent
Quader et al.

(10) Patent No.:  US 12,639,550 B2
(45) Date of Patent:      May 26, 2026

(54) ERRONEOUS CELL DETECTION USING AN ARTIFICIAL INTELLIGENCE MODEL

(71) Applicant: INTERNATIONAL BUSINESS MACHINES CORPORATION, Armonk, NY (US)

(72) Inventors: Shaikh Shahriar Quader, Scarborough (CA); Omar Al-Shamali, Edmonton (CA); James Miller, Edmonton (CA); Yannick Saillet, Stuttgart (DE); Albert Maier, Tuebingen (DE); Remus Lazar, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1225 days.

(21) Appl. No.: 17/455,461

(22) Filed: Nov. 18, 2021

(65) Prior Publication Data

US 2023/0153566 A1      May 18, 2023

(51) Int. Cl.
| | |
|---|---|
| *G06N 3/04* | (2023.01) |
| *G06F 16/215* | (2019.01) |
| *G06F 16/28* | (2019.01) |

(52) U.S. Cl.
CPC ............. *G06N 3/04* (2013.01); *G06F 16/215* (2019.01); *G06F 16/285* (2019.01)

(58) Field of Classification Search
CPC ........ G06N 3/04; G06N 20/00; G06F 16/285; G06F 16/215; G06F 40/177; G06F 40/18;
(Continued)

(56) References Cited

U.S. PATENT DOCUMENTS

| | | | |
|---|---|---|---|
| 5,943,663 A | 8/1999 | Mouradian | |
| 6,766,512 B1 * | 7/2004 | Khosrowshahi | ........ G06F 40/18 |
| | | | 715/234 |

(Continued)

FOREIGN PATENT DOCUMENTS

| | | |
|---|---|---|
| CA | 2243120 C | 7/1997 |
| CN | 1285556 A | 2/2001 |

(Continued)

OTHER PUBLICATIONS

Liu, et al., "Outlier Detection Algorithm Based on SOM Neural Network for Spatial Series Dataset", 2018 Tenth International Conference on Advanced Computational Intelligence (ICACI), Mar. 2018, pp. 162-168.

(Continued)

*Primary Examiner* — Evan Aspinwall
(74) *Attorney, Agent, or Firm* — Rakesh Roy, Esq.; Matthew M. Hulihan, Esq.; Heslin Rothenberg Farley & Mesiti P.C.

(57) ABSTRACT

Classification of cell data includes obtaining a target dataset and an artificial intelligence (AI) model trained to identify relationship(s) between cells of a row and classify whether a focus cell of the row is erroneous based on the identified relationship(s), and applying the AI model to the target dataset to identify erroneous cell(s) thereof. The applying includes selecting a row of cells of the target dataset, inputting the selected row of cells to the AI model with an identification of a focus cell, the focus cell to be classified by the AI model, classifying the focus cell to obtain a classification of the focus cell, the classifying identifying whether the focus cell is erroneous, and outputting an indication of the classification of the focus cell.

20 Claims, 8 Drawing Sheets

(58) Field of Classification Search
CPC .... G06F 40/103; G06F 17/18; G06F 16/2282; G06F 3/0641; G06F 3/0652; G06F 18/211; G06F 18/214
USPC .......................................... 707/737; 706/12
See application file for complete search history.

(56) References Cited

U.S. PATENT DOCUMENTS

| | | | |
|---|---|---|---|
| 10,599,954 B2 | 3/2020 | Sun | |
| 11,734,937 B1 * | 8/2023 | Pushkin | G06F 18/2155 |
| | | | 706/12 |
| 2006/0155797 A1 | 7/2006 | Jeang et al. | |
| 2013/0346844 A1 * | 12/2013 | Graepel | G06F 40/18 |
| | | | 715/219 |
| 2015/0046785 A1 * | 2/2015 | Byron | G06F 40/18 |
| | | | 715/227 |
| 2016/0019198 A1 * | 1/2016 | Welton | G06F 40/18 |
| | | | 715/220 |
| 2018/0203836 A1 * | 7/2018 | Singh | G06N 3/0499 |
| 2018/0285349 A1 | 10/2018 | Mineno et al. | |
| 2019/0332966 A1 | 10/2019 | Gidney et al. | |
| 2019/0354613 A1 | 11/2019 | Zoldi et al. | |
| 2020/0302009 A1 * | 9/2020 | Stegmaier | G06N 3/08 |
| 2020/0349169 A1 | 11/2020 | Venkatesan et al. | |
| 2021/0182476 A1 | 6/2021 | Cervelli et al. | |
| 2021/0209297 A1 * | 7/2021 | Dong | G06F 40/106 |
| 2021/0256214 A1 | 8/2021 | Gretz et al. | |
| 2021/0383191 A1 * | 12/2021 | Ainslie | G06N 3/0455 |
| 2022/0342583 A1 * | 10/2022 | Scott | G06F 40/30 |
| 2022/0391414 A1 * | 12/2022 | Baur | G06F 16/285 |

FOREIGN PATENT DOCUMENTS

| | | |
|---|---|---|
| CN | 103150454 A | 6/2013 |
| CN | 107038157 A | 8/2017 |
| CN | 112817863 A | 5/2021 |
| CN | 113010503 A | 6/2021 |
| CN | 113411405 A | 9/2021 |
| WO | WO2020013956 A1 | 1/2020 |
| WO | 2023/088109 A1 | 5/2023 |

OTHER PUBLICATIONS

Abutbul, et al., "DNF-Net: A Neural Architecture for Tabular Data", arXiv:2006.06465v1 [cs.LG] Jun. 2020, 17 pgs.

Mell, et al., "The NIST Definition of Cloud Computing", NIST Special Publication 800-145, Sep. 2011, Gaithersburg, MD, 7 pgs.

Singh, et al., "Melford: Using Neural Networks to Find Spreadsheet Errors", Microsoft Tech Report No. MSR-TR-2017-5, Jan. 2017, 13 pgs. Retrieved on Nov. 8, 2021 from Internet URL: https://www.microsoft.com/en-us/research/wp-content/uploads/2017/01/melford-tr-Jan2017-1.pdf.

Rekatsinas, et al., "HoloClean: holistic data repairs with probabilistic inference." VLDB Endowment, Aug. 2017, 13 pgs. Retrieved on Nov. 9, 2021 from Internet URL: https://arxiv.org > pdf > 1702.00820.pdf.

Huang, et al., "Auto-Detect: Data-Driven Error Detection in Tables" in Proceedings of the 2018 International Conference on Management of Data, 2018, 16 pgs. Retrieved on Nov. 9, 2021 from Internet URL: https://www.microsoft.com/en-us/research/publication/auto-detect-data-driven-error-detection-tables/.

Dallachiesa et al., "NADEEF: A Commodity Data Cleaning System," in Proceedings of the 2013 International Conference on Management of Data—SIGMOD '13, 2013, 12 pgs., doi: 10.1145/2463676.2465327. Retrieved on Nov. 9, 2021 from Internet URL: www.cs.ucr.edu > ~eldawy > publications > NADEEFSigmod2013.pdf.

Schelter, et al., "Automating Large-Scale Data Quality Verification." VLDB Endowment, Aug. 2018, pp. 1781-1794. Retrieved on Nov. 9, 2021 from Internet URL: https://ssc.io/publication/.

Rashid, et al., "Completeness and Consistency Analysis for Evolving Knowledge Bases," J. Web Semant., vol. 54, Jan. 2019, 13 pgs. doi: 10.1016/j.websem.2018.11.004. Retrieved on Nov. 9, 2021 from Internet URL: https://arxiv.org/abs/1811.12721, 31 pgs.

Saxena, H., et al., "Distributed Discovery of Functional Dependencies", 2019 IEEE 35th International Conference on Data Engineering (ICDE), Apr. 2019, 4 pgs. Retrieved on Nov. 9, 2021 from Internet URL: https://cs.uwaterloo.ca > ~h2saxena > fd_discovery.pdf.

Rezig, et al., "Pattern-Driven Data Cleaning", ArXiv171209437 Cs, Dec. 2017, 13 pgs. Retrieved on Nov. 9, 2021 from Internet URL: https://arxiv.org/abs/1712.09437.

Qahtan, et al., "Pattern functional dependencies for data cleaning", VLDB Endowment, Jan. 2020, 14 pgs. Retrieved on Nov. 9, 2021 from Internet URL: http://dspace.library.uu.nl/handle/1874/396267.

Reddy, et al., "Using Gaussian Mixture Models to Detect Outliers in Seasonal Univariate Network Traffic," in 2017 IEEE Security and Privacy Workshops (SPW), May 2017, pp. 229-234. Retrieved on Nov. 9, 2021 from Internet URL: https://www.computer.org/csdl/proceedings-article/spw/2017/1968a229/12OmNyRPgz6.

Pit-Claudel, et al., "Outlier Detection in Heterogeneous Datasets Using Automatic Tuple Expansion", Feb. 2016, 12 pgs. Retrieved on Nov. 9, 2021 from Internet URL: https://dspace.mit.edu > bitstream > handle > 1721.1 > 101150 > MIT-CSAIL-TR-2016-002.pdf?sequen.

Riahi, et al., "Model-based Exception Mining for Object-Relational Data," Data Min. Knowl. Discov., vol. 34, No. 3, pp. 681-722, May 2020. Abstract retrieved on Nov. 9, 2021 from Internet URL: https://arxiv.org/abs/1807.00381, 10 pgs.

Liu, et al., "Generative Adversarial Active Learning for Unsupervised Outlier Detection", IEEE Trans. Knowl. Data Eng., pp. 1-1, 2019, doi: 10.1109/TKDE.2019.2905606. Retrieved on Nov. 9, 2021 from Internet URL: https://arxiv.org/abs/1809.10816, 13 pgs.

Vaswani, et al., "Attention is All you Need", in Advances in Neural Information Processing Systems 30, I. Guyon, U. V. Luxburg, S. Bengio, H. Wallach, R. Fergus, S. Vishwanathan, and R. Garnett, Eds. Curran Associates, Inc., 2017, pp. 5998-6008. Retrieved on Nov. 9, 2021 from Internet URL: https://arxiv.org/abs/1706.03762.

Wei, et al., "EDA: Easy Data Augmentation Techniques for Boosting Performance on Text Classification Tasks", arXiv190111196 Cs, Aug. 2019, 9 pgs. Retrieved on Nov. 9, 2021 from Internet URL: https://arxiv.org/abs/1901.11196.

International Search Report and Written Opinion for PCT/CN2022/129891 completed Jan. 18, 2023, 13 pgs.

* cited by examiner

START

OBTAIN INITIAL DATASET — 502

PERFORM DATA MODIFICATION ON CELL(S) OF INITIAL DATASET — 504

LABEL THE SELECTED, MODIFIED CELL(S) AS ERRONEOUS — 506

PROVIDE INITIAL DATASET, WITH IMPARTED ERRORS AND LEBELED CELLS, AS TRAINING DATASET — 508

END

ERRONEOUS CELL DETECTION USING AN ARTIFICIAL INTELLIGENCE MODEL

BACKGROUND

Error detection is an important part of any data analytics pipeline. Without error detection, the pipeline risks outputting 'garbage data' that could have adverse downstream effects to the pipeline. Many databases in use today are very large and cannot be analyzed manually for errors within a reasonable amount of time, and therefore automated approaches to error detection have been developed.

SUMMARY

Shortcomings of the prior art are overcome and additional advantages are provided through the provision of a computer-implemented method. The method obtains a target dataset. The target dataset includes rows and columns of data cells. The method also obtains an artificial intelligence (AI) model trained to identify one or more relationships between cells of a row and classify whether a selected focus cell of the row is erroneous based at least in part on the identified one or more relationships. The method additionally applies the AI model to the target dataset to identify one or more erroneous cells of the target dataset. The applying includes selecting a row of cells of the target dataset. The applying also includes inputting the selected row of cells to the AI model with an identification of a focus cell of the selected row of cells, where the focus cell is to be classified by the AI model. The applying additionally includes classifying, by the AI model, the focus cell to obtain a classification of the focus cell. The classifying identifies whether the focus cell is erroneous. In addition, the applying outputs an indication of the classification of the focus cell.

Further, a computer system is provided that includes a memory and a processor in communication with the memory, wherein the computer system is configured to perform a method. The method obtains a target dataset. The target dataset includes rows and columns of data cells. The method also obtains an artificial intelligence (AI) model trained to identify one or more relationships between cells of a row and classify whether a selected focus cell of the row is erroneous based at least in part on the identified one or more relationships. The method additionally applies the AI model to the target dataset to identify one or more erroneous cells of the target dataset. The applying includes selecting a row of cells of the target dataset. The applying also includes inputting the selected row of cells to the AI model with an identification of a focus cell of the selected row of cells, where the focus cell is to be classified by the AI model. The applying additionally includes classifying, by the AI model, the focus cell to obtain a classification of the focus cell. The classifying identifies whether the focus cell is erroneous. In addition, the applying outputs an indication of the classification of the focus cell.

Yet further, a computer program product including a computer readable storage medium readable by a processing circuit and storing instructions for execution by the processing circuit is provided for performing a method. The method obtains a target dataset. The target dataset includes rows and columns of data cells. The method also obtains an artificial intelligence (AI) model trained to identify one or more relationships between cells of a row and classify whether a selected focus cell of the row is erroneous based at least in part on the identified one or more relationships. The method additionally applies the AI model to the target dataset to identify one or more erroneous cells of the target dataset. The applying includes selecting a row of cells of the target dataset. The applying also includes inputting the selected row of cells to the AI model with an identification of a focus cell of the selected row of cells, where the focus cell is to be classified by the AI model. The applying additionally includes classifying, by the AI model, the focus cell to obtain a classification of the focus cell. The classifying identifies whether the focus cell is erroneous. In addition, the applying outputs an indication of the classification of the focus cell.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for data classification, particularly classification of data cells of rows within tabular datasets to identify erroneous cells. Classification is by way of a trained machine learning/artificial intelligence (AI) model, for instance one implemented as a neural network architecture. The model is configured to take cells of a row of a dataset, i.e. take the cell data of those cells in the dataset, along with an indication of a cell of that row (e.g. the focus cell) to be classified. The model can then use an attention mechanism of the model to determine relationship(s) between the focus cell and other cell(s) of that row and classify the focus cell accordingly. Reference herein to a 'cell' refers at least in part to the cell data of that cell, such that input of a 'cell' to an AI model refers to input of at least the cell data of that cell, and classification of a 'cell' refers to at least classification of the cell data of that cell. Input of a row of cells to an AI model refers to the input to the AI model of at least the cell data of a plurality of cells of that row.

The classification of a cell could be a binary classification, for instance one that classifies whether or not the cell is erroneous in terms of its cell data/formatting. Since the model can be trained to detect various different types of errors, other/additional classifications may be possible, for instance multi-classifications that identify the specific type(s) of error(s) detected for an erroneous cell.

Figure 1:
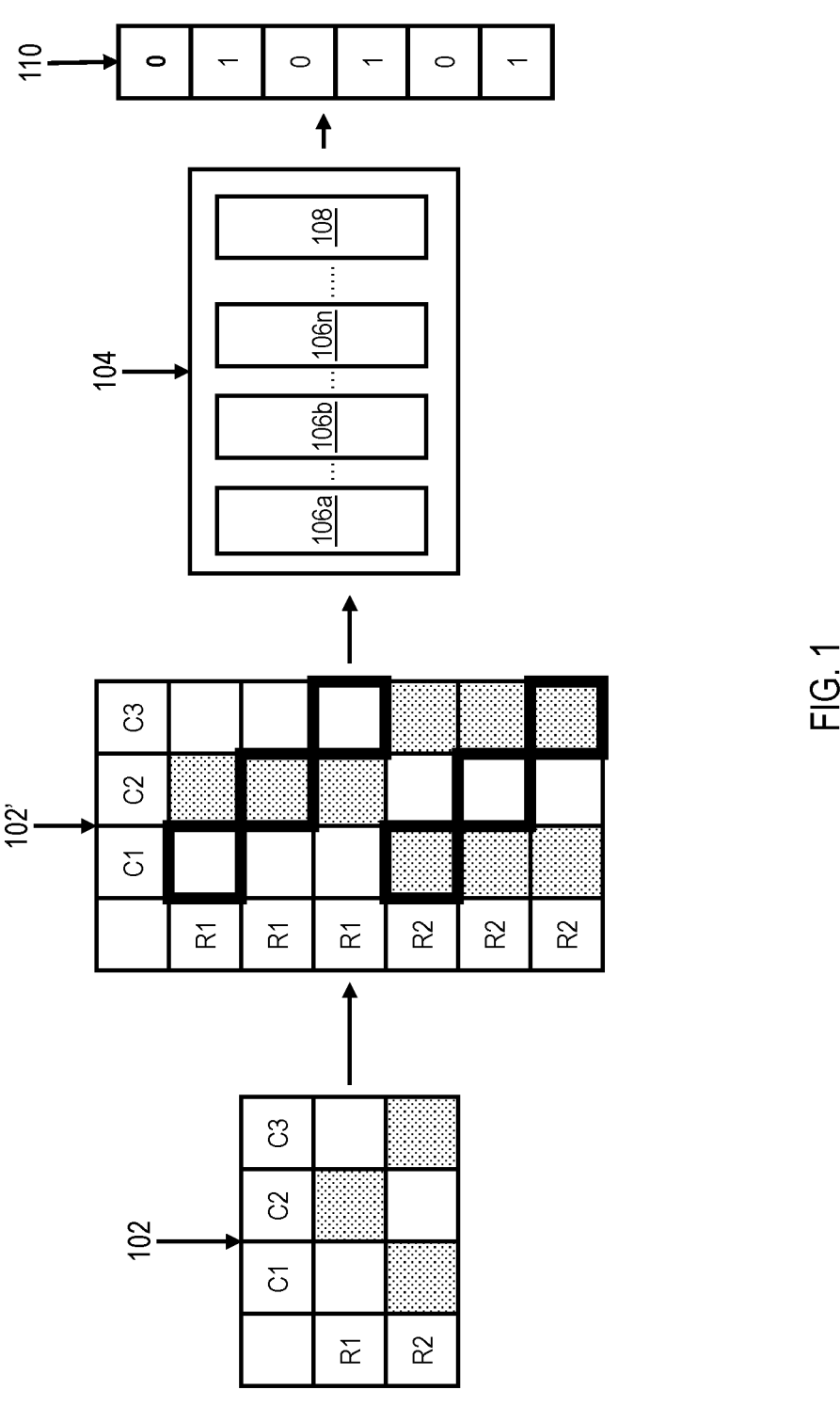
FIG. 1 depicts an example conceptual diagram of a process flow for data cell classification model training and implementation in accordance with aspects described herein.

FIG. 1 depicts an example conceptual diagram of a process flow for data cell classification model training and implementation in accordance with aspects described herein. A dataset 102 of rows and columns of data cells is obtained and reformatted into reformatted dataset 102'. Dataset 102 is represented with just two rows R1 and R2 and three columns C1, C2, C3 in this example for convenience. It should be appreciated that, in practice, such a dataset could include many more rows and columns. It is not uncommon for datasets to be millions of rows long and include tens or hundreds or columns, for example.

Dataset 102 includes erroneous cells indicated by shading in FIG. 1, i.e. cell (R1, C2), cell (R2, C1) and cell (R2, C3). An erroneous cell is one with cell data or format that is erroneous in the context. As examples, a cell that is required to have a data value but that contains no data is erroneous (i.e. a missing value error), a cell that is to provide a time but instead provides a date is erroneous (i.e. a formatting error), and a cell that reflects the age of a living human as 1250 years old is erroneous (i.e. a data constraint error since no human being lives that long). Many other examples of erroneous cell data/format exist.

In some examples, the cell is erroneous as informed by its context. For instance, if the cell is to indicate a city and neighboring cells are to indicate the country and postal code of that city, then a cell indicating "New York" (to reflect the city in the United States) is erroneous if the neighboring cells indicate the country to be "Canada" and the postal code to be "N5A 3H1", since New York city is not in the country of Canada and does not have a postal code of N5A 3H1.

The reformatting of dataset 102 into reformatted dataset 102' created an expanded dataset that includes a greater number of rows than does dataset 102. In one embodiment, the reformatting creates one or more copies of each row of dataset 102 so that the number of instances of each row in the reformatted dataset 102' totals the number of columns of the dataset 102. In the example of FIG. 1, there are three columns and therefore two additional copies of row R1 and two additional copies of row R2 are created to total six rows in reformatted dataset 102'. Each row of dataset 102' has a specified cell of focus ('focus cell'), which is indicated by bold outline in FIG. 1. The focus cell of a row may be indicated to model 104 as being the cell for the model to classify for an input row of cells. For any cell of dataset 102, i.e. any combination of a column (C1, C2, C3) and a row (R1, R2), there is a respective, corresponding row of dataset 102' with that cell as its focus cell.

Reformatted data, e.g. the data of reformatted dataset 102', can be provided to model 104 on a row-by-row basis. The model accepts, as input, cells of a row, for instance all cells of the row or a subset of cells of the row, with the focus cell being specified. For instance, input of a row of cells to the model may be accomplished by providing the cell data of each of the cells of the row to the model. The indication of the focus cell could be an indication to the model of the particular cell data that was taken from the focus cell of the dataset and provided to the model as part of the input.

In a particular example, and for each row of dataset 102', the cell data of the cells of that row are concatenated into a respective string in which delimiters separate the cell data of the row and the string identifies which data in that string is the focus cell data. For instance, if a row includes the string "Canada" in the first cell (corresponding to column C1), the string "New York" in the second cell (corresponding to column C2), and the numeral "30" in the third cell (corresponding to column C3), then the cell data of these cells can be concatenated into a string and each separated by a delimiter, such as a comma, as "Canada, New York, 30". Further, the focus cell can be indicated using any desired indication, for instance a selected character, such as a vertical line (|), at the beginning and end of the focus cell data within the string. If the focus cell is the second cell in the example above, the string may be provided as "Canada, |New York|, 30". Accordingly, inputting a selected row of cells to the model can be effected by inputting a string of cell data that is composed of the cell data in each of the cells. This can include the cell data of the focus cell. A process that applies the model can build the string of cell data and provide a delimiter between cell data of different cells. The identification of the focus cell can include an identification of the cell data of the focus cell within the string. In particular, when building the string, the process can insert a selected character or other identifier into the string at one or more positions, for instance position(s) relative to the cell data of the focus cell, for instance before and after the cell data of the focus cell. The AI model can be configured to identify the focus cell by locating the inserted identifier.

Though dataset 102' is depicted in a table format with rows and columns, it should be understood that reformatted data generated from dataset 102 may or may not be provided/stored as a separate reformatted dataset 102'. A reformatted dataset could be represented as strings using the string representation described above since each string representation indicates the individual data of each cell of the row and indicates which cell is the focus. Alternatively, the process need not create and store a discrete additional dataset 102', and instead could build the string representations of each of the six rows depicted in 102' directly and on-the-fly from dataset 102, in which, for each row of dataset 102, the process iteratively builds another string representation indicating the sequentially next cell of the row as being the focus cell and provides the built strings to model 104 for classification of the focus cell of each string.

Model 104 utilizes an attention mechanism and may be trained to identify relationship(s) between cells and classify whether a selected focus cell of the row is erroneous based at least in part on the identified relationship(s). In examples, the model 104 is built using a multi-head self-attention approach and trained to identify the relationship(s) by way of a multi-head attention component that includes attention heads, where the relationship(s) inform a context of the focus cell based at least in part on cells neighboring the focus cell, and where the AI model is configured to classify the focus cell based at least in part on the informed context. In this manner, the configurable number of self-attention heads may be used to identify the relationships between the focus cell and other cells in the row, for instance. By way of specific example using the above in which a row includes country, city, and age data, one head might identify a relationship between country and city and another head might identify a relationship between age and city. Other heads might identify relationships between any combination of other cells of the row and/or other rows of the dataset being used for input. The number of heads can be a configurable parameter that is specified when the model is built. As a specific example, the number of heads is twelve, though this number can vary and in practice could be any number.

The specific number to use could be determined through experimentation to identify the best number to use for a given data domain, given set of data columns, etc.

The model 104 in the example of FIG. 1 is implemented in part using a plurality of encoder layers 106a, 106b, . . . , 106n, and the attention mechanism is provided as a set of attention layers within those encoder layers. Each encoder layer 106a, 106b, . . . , 106n can include respective attention layer(s) and a feed-forward layer, for example. The model 104 sends output of an attention layer in an encoder layer to the feed-forward layer of the encoder layer. The feed-forward layer may be a neural network that processes the output of the attention layer and provides that as input to a next encoder layer of the model 104. In examples, the model 104 has a plurality of stacked encoder layers. This number can vary and in practice could be any number.

The last layer of model 104 is the classification layer 108. In examples, this is a perceptron layer, either a single-layer perceptron or multi-layer perceptron, that uses an activation function configured (e.g. trained) to provide the classification of the focus cell. By way of specific example, the activation function could be the softmax function. In some examples described and depicted, the classification is a binary classification of the focus cell (e.g. as erroneous or correct/not erroneous), though in examples the classification is a multi-class (k possible classes, k>2) classification, for instance that classifies based on type of error of the focus cell. It is appreciated that the classification might be performed by determining probabilities as to the classification of an input (e.g. the focus cell of the input cell data of a row) into the various classifications, in which the probabilities sum to 1 and the class with the highest determined probability is selected as the class of the input (the focus cell). Various approaches exist for classifying an input into two or more classes.

The process flow in FIG. 1 shows an input dataset 102 being reformatted for provision row-by-row into model 104. These aspects are applicable to both training the model 104, as part of a training phase, and the use/application of a trained model 104 to classify the inputs as part of a classification phase. For instance, in a training phase, as is explained in grater detail below, a training dataset (e.g. 102) has labeled cell data, meaning it is known which cell data is erroneous. For instance, each cell is labeled or otherwise taken to be either 'erroneous' (and/or labeled with a particular type of error, if erroneous) or correct/not erroneous. The training dataset can be reformatted into reformatted data and fed into the model 104 to train the model based on those labeled inputs, i.e. train the model 104 to classify a focus cell of an input row of cells based on data of other cell(s) of the input row of cells.

In a classification phase, a process applies the AI model (trained) 104 to an input/target dataset (e.g. 102) to identify erroneous cell(s) thereof. The target dataset is not labeled, e.g. it is not known which cells are erroneous, and the trained model is used to classify, for each input row of cells, the focus cell as to at least whether it is erroneous. In a specific example, a process applies the model by selecting a row of cells of the target dataset, inputting the selected row of cells to the model with an identification of a focus cell of that selected row, then the model classifies the focus cell to obtain a classification thereof the focus cell and outputs an indication of the classification of the focus cell. By iterating this across focus cells (of one or more rows), the model 104 produces a classification table 110 as an output. In the example of FIG. 1, the classification is a binary classification that classifies the focus cell of each input as being either erroneous, indicated by the value 1, or correct (or at least 'not erroneous'), indicated by the value 0.

The classification table 110 is presented as a multi-row, single column table, in which each row of the classification table correlates to the corresponding row or input of the dataset 102'. It is noted that the first three rows of 102' are the same row in that they contain the same data representative of a same entity but are represented as three because of the three different indications of the focus cell.

In FIG. 1, the first input to the model, corresponding to the first row of dataset 102', indicates the first cell as the focus cell. The model 104 identifies that this cell is not erroneous and outputs a "0" in the first row of the classification table 110. On a next iteration, the model takes a second input—the second row of dataset 102'—indicating the second cell of that row of dataset 102' as being the focus cell. It is noted that the first and second inputs are both the first row of the target dataset 102—the first and second inputs contain the same cell data. The only difference between these first and second input rows is the focus cell being indicated. On this second input, the model 104 identifies the focus cells as erroneous and outputs a "1" in the second row of the classification table 110. This continues, classifying the focus cell of each input, and in this example continues for each other row of the six rows of the modified dataset 102'. In effect, each row of dataset 102 is input three times to the model 104, which a different focus cell being identified each time.

Both training the model 104 on a labeled input dataset and using the model to classify an (unlabeled) target dataset can proceed by (i) iterating over one or more (or each of the) cells in a row of the input dataset, where at each iteration the cell data of the cells of the row are input into the model and indicate a next cell of that row as the focus cell, and the model classifies the indicated focus cell, and then (ii) iterating that iterating (i) over one or more (or each of the) rows of the target dataset. This iterating and classifying can be performed automatically, without requiring any live, manual interaction by users.

Thus, in one approach to building an AI model that is configured to classify cells of a dataset, the building includes obtaining the training dataset and training the AI model using the training dataset. The training includes, for instance, (i) selecting a row of cells of the training dataset, then (ii) iteratively performing, for each cell of a plurality of cells of the selected row of cells, inputting the row of cells to the AI model and indicating the cell as being a focus cell along with a label as to whether the focus cell is erroneous, then (iii) repeating the selecting and the iteratively performing for one or more other rows of cells of the training dataset. The training provides labels to the AI model as to which cells are erroneous, and thus the training trains the AI model to classify (e.g. in a classification phase) a selected focus cell of an input row of cells as to whether the selected focus cell is erroneous based at least in part on cell values of other cells of the input row of cells.

Then, in one approach to classifying a target dataset as to which cells of the target dataset are erroneous, the target data is obtained for classification by the trained AI model, then a row of cells of the target dataset is selected, and a process iteratively performs (i) inputting to the AI model the selected row of cells with an indication of a focus cell of the selected row of cells, and (ii) obtaining, based on the inputting, an indication of whether the indicated focus cell is erroneous based at least in part on cell values of other cells of the selected row of cells. At each iteration of the iteratively performing, a different cell of the selected row of cells is indicated as the focus cell. The process can then repeat the row selection and the and the iteratively performing for one or more other rows of cells of the target dataset.

By way of specific example using the example of dataset 102 as a target dataset to classify, a process selects the first row (R1) of cells, inputs the selected row to the AI model with an identification of a focus cell (the first cell of the row) to be classified by the AI model, classifies, by the AI model, the focus cell to obtain a classification of the focus cell, and outputs an indication of that classification (e.g. as a 0 in the first row of table 110. In this first instance, the first cell of the first row of dataset 102 is classified. The process then iterates the foregoing over the other cells of the row (R1). Thus, it iterates the inputting the selected row (R1) but does so by identifying a next focus cell of the row. The next focus cell can be selected as the sequentially-next cell, for instance the second cell of row R1. In any case, when iterating over the cells of the row, the process could select the next focus cell as any cell different from any prior-identified and classified focus cell of the row. Here, the process has classified to this point only the first cell of the row. The iterating classifies that next focus cell, and outputs an indication of the classification of that next focus cell, i.e. as a 1 in the second row of table 110). Then, on a next iteration, the row R1 is again input but identifies the third cell of the row as the focus cell. This is classified and the classification is output to the third row of table 110. In these examples the row is input to the model three different times with a different focus cell indicated each time, though it is understood that, alternatively, the row data could be provided once and either the process providing the input row model, or the model itself, could iteratively identify next focus cell and classify that cell before moving onto the next focus cell. This approach could also be taken during model training, in which each row is fed once to the model instead of each time a different focus cell is identified.

The iterating over cells of a row can stop based on iterating over and classifying each cell of the row of cells. Thus, after the three iterations discussed above to classify each cell of row R1, the iterating over the row R1 can stop. At that point, the process can begin iterating over one or more other rows of the target dataset. For instance, the process can select the next row, R2, of dataset 102 and repeat the above to iteratively classify each cell of that row—by iterative supplying the row as input to the model but indicating a different focus cell of the row each time. This iterating can stop once each row of the target dataset has been processed in this manner.

It is noted that classification of the cells of the target dataset need not identify every cell of the dataset as being a focus cell for classification. The classification of the cells of the dataset can be selective, meaning some cells can be skipped (not indicated as the focus cell in any iteration). Additionally or alternatively, the classification need not classify each row, meaning some rows could be skipped if desired.

Further embodiments of data cell classification and model training are described with reference to FIG. 2, which depicts another example conceptual diagram of a process flow for data cell classification model training and implementation in accordance with aspects described herein.

For training an untrained model 204, an initial dataset 202 is obtained and input, for example by a technical user, to a training phase 212. Training phase 212 in this example trains the untrained model 204 using labeled data. The labeled data includes labeled cells, for instance a dataset of cells, with some cells of the dataset being labeled as correct and some other cells of the dataset being labels as erroneous (and/or indicating error(s) of one or more type(s)). In examples in which the initial dataset 202 does not include cells labeled as erroneous, data modification 214 of the training phase 214 is applied to the dataset 202 as described below to provide a training dataset to train the model 204. In other examples in which the input dataset 202 includes erroneous cells labeled as such, data modification 214 may optionally be performed to introduce additional erroneous cells into the dataset.

A user could manually label cells of a dataset to provide a labeled training dataset. Additionally or alternatively, the user might manipulate cell values of an initial dataset to provide erroneous cells and label them as such. As yet another possibility, the user could 'clean' an initial dataset to provide a 'cleaned' dataset (one that is taken as having only correct cells, for instance after the user manually corrects the initial dataset) and a process could compare the cleaned dataset to the initial dataset to identify which cells of the initial dataset were modified by the user to clean them. Those cells could be labeled as erroneous and the other cells of the initial dataset (i.e. that are the same as in the cleaned dataset) could be labeled as correct, to provide the training dataset.

In some examples, the dataset 202 is a proper subset of a larger dataset and the proper subset is selected automatically or manually by the user. The subset may be selected as a subset (of the larger dataset) that has no known errors, i.e. no erroneous cells, and therefore the labeling of these cells as 'correct' may be implied. In examples, the selected subset or a dataset based thereon can be the training dataset and the remainder of the larger dataset (or a portion thereof) is the target dataset that is to be classified based on training the model using the training dataset.

Therefore, the dataset 202 may or may not be a subset of a larger dataset, and may or may not include data (i.e. cells) labeled correct and/or erroneous. The dataset 202, if labeled, may or may not include cells labeled as erroneous. A user may or may not be involved in labeling cells of the dataset 202. In some embodiments, the data modification 214 imparts erroneous cells into a dataset that may or may not already include erroneous cells.

In any case, training the (untrained) model 204 uses a labeled dataset that includes both correct and erroneous data (i.e. cells), referred to herein as the training dataset. The training phase 212 may or may not perform data modification to the input dataset 202, and in examples performs data modification 214 when the input dataset contains no know erroneous cells and/or the input dataset is to include a higher percentage of erroneous data. Details of the data modification 214 are discussed below. The training dataset, possibly produced based on data modification 214, is used in training the untrained model 204, i.e. is fed as, e.g., rows/strings of cell data with, in each row/string, a cell of focus specified, as in the iterating described above except that instead of the model classifying the focus cell, the model trains using the label of the focus cell of the input. As a neural network, the model 204 updates its parameters using back-propagation, for example, to update weights of the model.

As part of model training, the model can learn or infer an expected formatting of the cell of focus based on the column in which it is located. For instance, the model can learn the format (e.g. string, date, time, decimal, domain, etc.) of the different delimited positions of the input (corresponding to specific columns of the input dataset) in order to help identify whether the data of an identified focus cell of an input row is a correct format given its position. By way of specific example, if the model recognizes that the $3^{rd}$ position in each input row is a city name (for instance an alpha-character string appearing in a dictionary of city names) and the focus cell of another input row is indicated to be the third cell/position of the input row and contains a numerical value, then the model can recognize that the focus cell is erroneous. Training the model to classify based at least in part on cell data of other cells in the row could, for instance, be used in evaluating whether a correctly formatted cell is nonetheless erroneous on account of surrounding cell data. Using the example above, the model could recognize that a focus cell in the $3^{rd}$ position indicates "New York" (correctly formatted and a valid city) but also recognize based on neighboring cells, for instance those of the same row, that indicate 'Canada' as the Country and 'N5A 3H1' as the postal code that the focus cell is erroneous.

The training phase 212 produces a trained model 204'. The trained model 204' can then be used to classify a target dataset 216, i.e. classify cells thereof as to whether they are correct or erroneous, and optionally, if erroneous, the error(s) rendering them erroneous. An output of the model 204' can be a classification table 210 indicating a respective classification, by the model 204', for each cell of the input target dataset 216. Further automatic or manual processing can then be performed. As one example, a user can manually 'clean' the cells that were classified as being erroneous. As another example, a computer process could automatically take action, such as alerting one or more users of the erroneous cells and/or automatically marking, deleting, filtering, etc. the erroneous cells from the target dataset to produce a modified dataset with only cell data that was classified by the model as not being erroneous.

Figure 2:
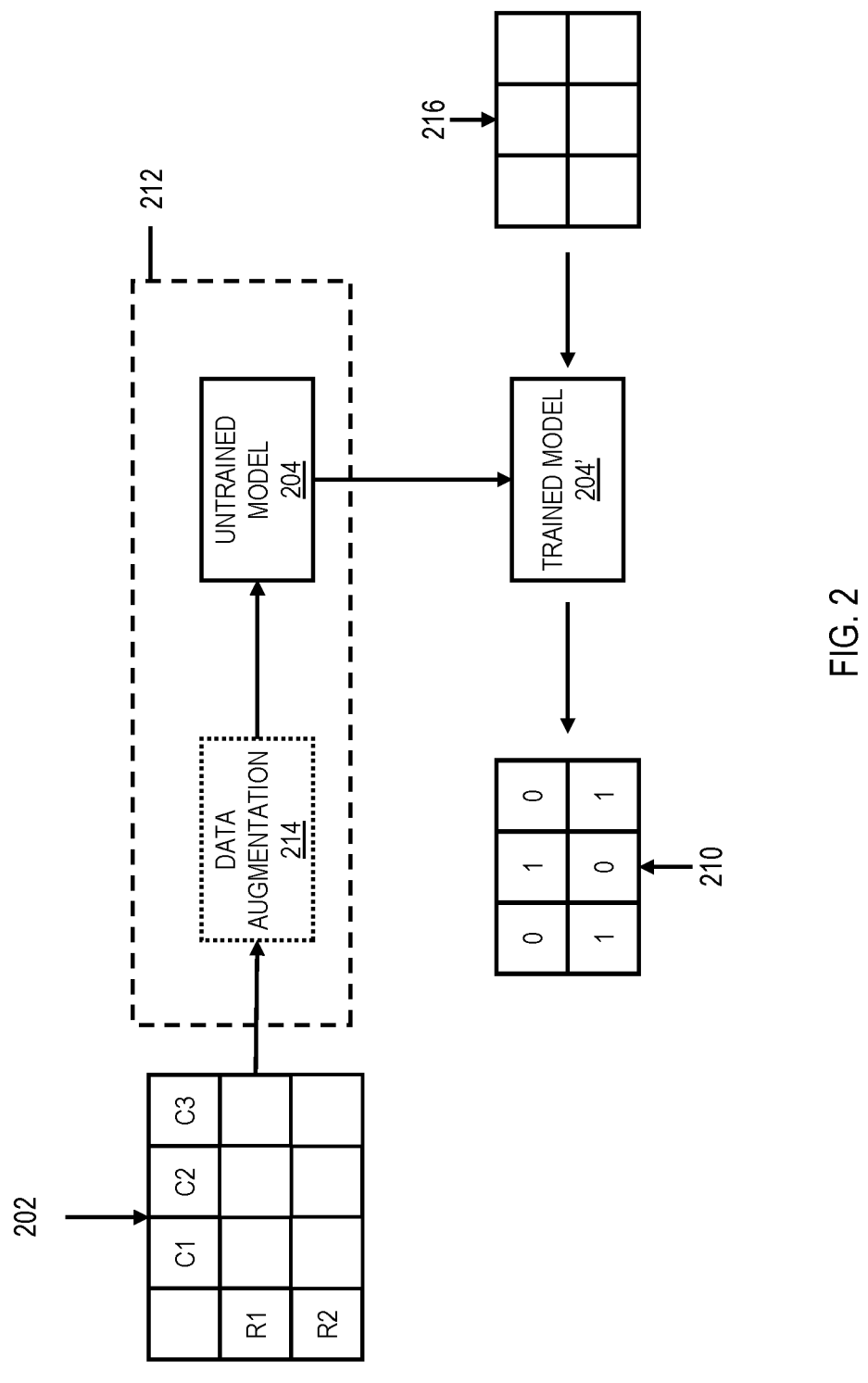
FIG. 2 depicts another example conceptual diagram of a process flow for data cell classification model training and implementation in accordance with aspects described herein.

It should be understood that the model could undergo two or more training phases, in which case the 'untrained model' 204 of FIG. 2 represents the model before a training phase and the trained model 204' represents the model 204 after training of that training phase.

In a particular embodiment, a user provides, as input for purposes of training a model as described herein, a subset (e.g. some rows) of a larger dataset. The subset may be provided with no known errors, for instance because the user has manually checked and cleaned/corrected the data as necessary, or because it is known to be correct through some other method. A process can then apply data modification to the provided subset to introduce errors into the subset, i.e. manipulate data values of various cells of the subset to render those cells erroneous. Those cells can then be automatically labeled as erroneous, while the remaining, unmodified cells can be automatically labeled as correct. This modified subset with errors introduced therein is fed to the AI model as a training dataset, in which the modified subset is used to train the model. Once trained, the AI model can be applied to target dataset(s) for classification to classify cells thereof as being correct or erroneous. One example target dataset is another portion (different from the provided subset above) of the larger dataset from which the subset was initially taken. In examples, the datasets to be classified may include a same or similar type of data domain and same or similar columns as compared to the training dataset.

As noted above, data modification 214 may be applied to a dataset to create artificial errors in the dataset and provide labeled erroneous cells of the dataset. The data modification 214 can modify one or more cells to render them erroneous (for instance by deleting the data, providing incorrectly formatted data, providing invalid values, etc.) and label them as erroneous. In the event that the dataset 202 is unlabeled but is taken to conclude only correct cells, the data modification can modify and label cells of the dataset as erroneous, and label the other cells of that dataset as correct.

In embodiments of the data modification 214, a process selects for modification a random subset of the cells in the dataset. Those cells are to be modified to have erroneous cell data. The percentage of the cells to be modified could be predetermined by a user or based on experimentation, as examples.

In specific examples, the modification to a cell imparts one or more errors. Example types of errors can include, but are not limited to:

Typographical errors (TE)—in which the cell value contains a typographical error, for instance "1200t9" for a U.S. postal code or "New YUork" for the city "New York";

Value swapping across columns (VSAC)—in which data values of cells in different columns of a row are shifted/switched;

Value violating data constraints (VVDC)—in which a data value of a cell is invalid for violating a data constraint. For instance, there are implicit data constraints on the age of a human, i.e. it must be zero or greater, and has an upper limit (an age of 1250 years for a human is clearly invalid). Data constraints could be explicitly defined by a user, automatically defined based on statistical calculations and/or learning, as examples.

Formatting errors (FE)—in which data is formatted incorrectly; and/or

Missing values (MV)—the requires a value but is empty (no data)

To impart the errors, modification(s) are performed to cell data. Example such data modifications include, but are not limited to:

Random Character Replacement—in which a character of the cell being modified is randomly selected and replaced with another random character; used to impart TE errors, for instance;

Random Character Insertion—in which a random character is placed in a random position of the cell data of the cell being modified; used to impart TE and VVDC errors, for instance;

Random Character Deletion—in which a character at a random position of the cell being modified is removed; used to impart TE and VVDC errors, for instance;

Random Character Swapping—in which two characters of the cell data of the cell being modified are randomly selected and interchanged to swap their positions; used in impart TE errors, for instance;

Delete Value—in which the data of the cell is deleted; used to impart MV errors, for instance;

Swap Column Values—in which the values of two cells in the same row are swapped; used to impart VSAC, VVDC, and FE errors, for instance; and Swap Row Values—in which the values of two cells in the same column are swapped; used to impart VVDC errors, for instance.

Various other types of errors may be imparted using any kind of data modification(s) appropriate for imparting such errors.

Thus, in accordance with these aspects, a process can obtain an initial dataset, performing data modification on selected data cells of that initial dataset to impart errors in the selected data cells, and label the selected cells, as modified, as being erroneous. Then based on this data modification and labeling, the process could provide that initial dataset, now with the errors imparted in the selected data cells and with those cells labeled as erroneous, as the training dataset for training the model. The data modification on a selected data cell of the initial dataset can include, as examples, random character replacement, random character insertion, random character deletion, random character swapping, value deletion, column value swapping, and/or row value swapping. The data modification can impart in a selected data cell at least one error that can include, as examples, a typographical error, a value swap across columns error, a value violating data constraint error, a formatting error, and/or a missing value error.

Accuracy, recall, and precision of the model can vary depending on factors that include the percentage of erroneous cells in the training data on which the model was trained. This percentage can be controlled if desired. For instance, the percentage of errors in an input dataset can be increased to a desired extent using data modification as described herein. In testing, it was noted that, in general, increasing the percentage of errors in the training dataset increased model recall but decreased model precision, while decreasing the percentage of errors in the training dataset results in better precision but lower recall. The percentage of actual errors in the target dataset to be classified can also impact these markers of model performance. Thus, experimentation can be conducted to determine and select a desired percentage of erroneous cells to provide in a training dataset in order to optimize the model being trained.

Accordingly, as described in examples herein, a model can take as input an entire row of cells with a cell of focus specified, such that the model is to classify the cell of focus as to whether or not the cell is erroneous, and optionally, if so, the types of error(s). The attention mechanism and neural network architecture of the model classifies can find erroneous data that might otherwise not be detected if single cells are input and considered individually, i.e. without the context provided by other cell data of the row. The model can, for example, infer/learn relationship(s) between columns and learn data constraints for cells. The model can utilize a neural network architecture, in addition to the attention mechanism, to automatically learn this relationship without additional user input. In embodiments, the model learns to use other cells within the same row as the focus cell to help in error identification of the focus cell. The model can be trained to detect different types of errors and identify multiple errors (erroneous cells) in a tuple (e.g. row). This can all be done with relatively little or no input from a user, and meanwhile rely on only a relatively small subset of a larger dataset to train the model.

In some aspects, the selection and training of the AI model results in improved speed and/or accuracy or erroneous cell detection.

Additionally, aspects can be used to train a model to identify any of various types of errors that might exist in a dataset. Such errors could be errors in both numerical and non-numerical data types. Additionally or alternatively, the errors might be contextually informed rather than based on discrete rules that consider only the cell data itself.

Figure 3:
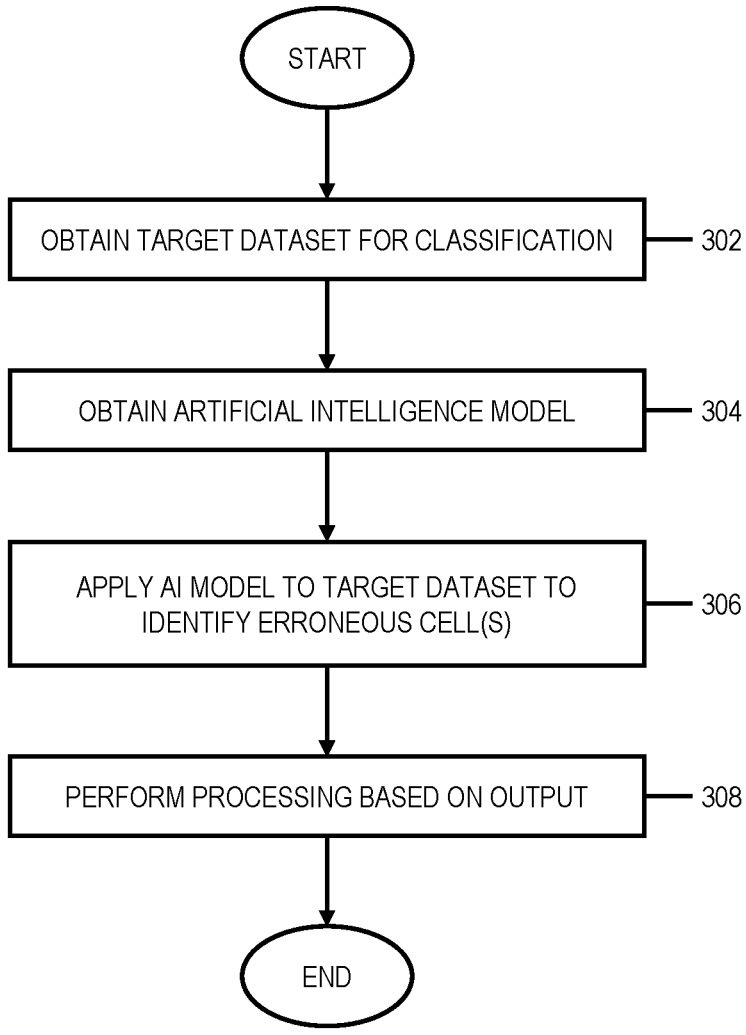
FIG. 3 depicts an example process for classifying erroneous cells of a dataset, in accordance with aspects described herein.

FIG. 3 depicts an example process for classifying erroneous cells of a dataset, in accordance with aspects described herein. In some examples, the process is performed by one or more computer systems, such as those described herein, which may be or include one or more cloud servers, and/or one or more other computer systems. The process obtains (302) a target dataset, where the target dataset is a tabular dataset including rows and columns of data cells. The process also obtains (304) an artificial intelligence (AI) model trained to identify one or more relationships between cells of a row and classify whether a selected focus cell of the row is erroneous based at least in part on the identified one or more relationships. In examples, the AI model is trained to identify the one or more relationships by way of a multi-head attention component that includes a plurality of attention heads. The one or more relationships can inform a context of the focus cell based at least in part on cells neighboring the focus cell (for instance within the same row or other rows of the dataset), and the AI model is configured to classify the focus cell based at least in part on the informed context. Additionally or alternatively, the AI model can include a plurality of encoder layers, where each such encoder layer includes a respective at least one attention layer and a feed-forward layer. The AI model can further include a perceptron layer that includes an activation function configured to provide the output classification of the focus cell being classified. The process of FIG. 3 also applies (306) the AI model to the target dataset to identify one or more erroneous cells of the target dataset. An example process for applying an AI model to identify erroneous cells in accordance with aspects described herein is provided with reference to FIG. 4. Continuing with FIG. 3, the process performs automatic processing (308), for instance the raising of an electronic alert to a user that indicates one or more erroneous cells of the target dataset and/or automatically modifying the target dataset to change data of one or more erroneous cells of the target dataset. Example such changing can include changing or deleting cells/cells data of cells that are erroneous, deleting from the dataset row(s) with erroneous cell data, and/or storing a modified version of the target dataset with the changes/deletions applied.

Additionally, though not depicted, the process of FIG. 3 could include training the AI model, for instance by obtaining a training dataset and training the AI model using the training dataset. The training dataset can include at least some cells labeled as erroneous and at least some cells labeled as correct. In examples, the training dataset is based on a first proper subset of a larger dataset. By 'based on' in this context is meant that the training dataset is the subset or is a modified version of the subset, such as the subset with modifications applied thereto to impart errors in cells of the subset. Additionally, the target dataset could be a second proper subset of that larger dataset, the second proper subset being different from the first proper subset, so that the model is trained on a subset of a larger dataset and then the model is used to classify erroneous cells of the rest (or a portion thereof) of that larger dataset.

Figure 4:
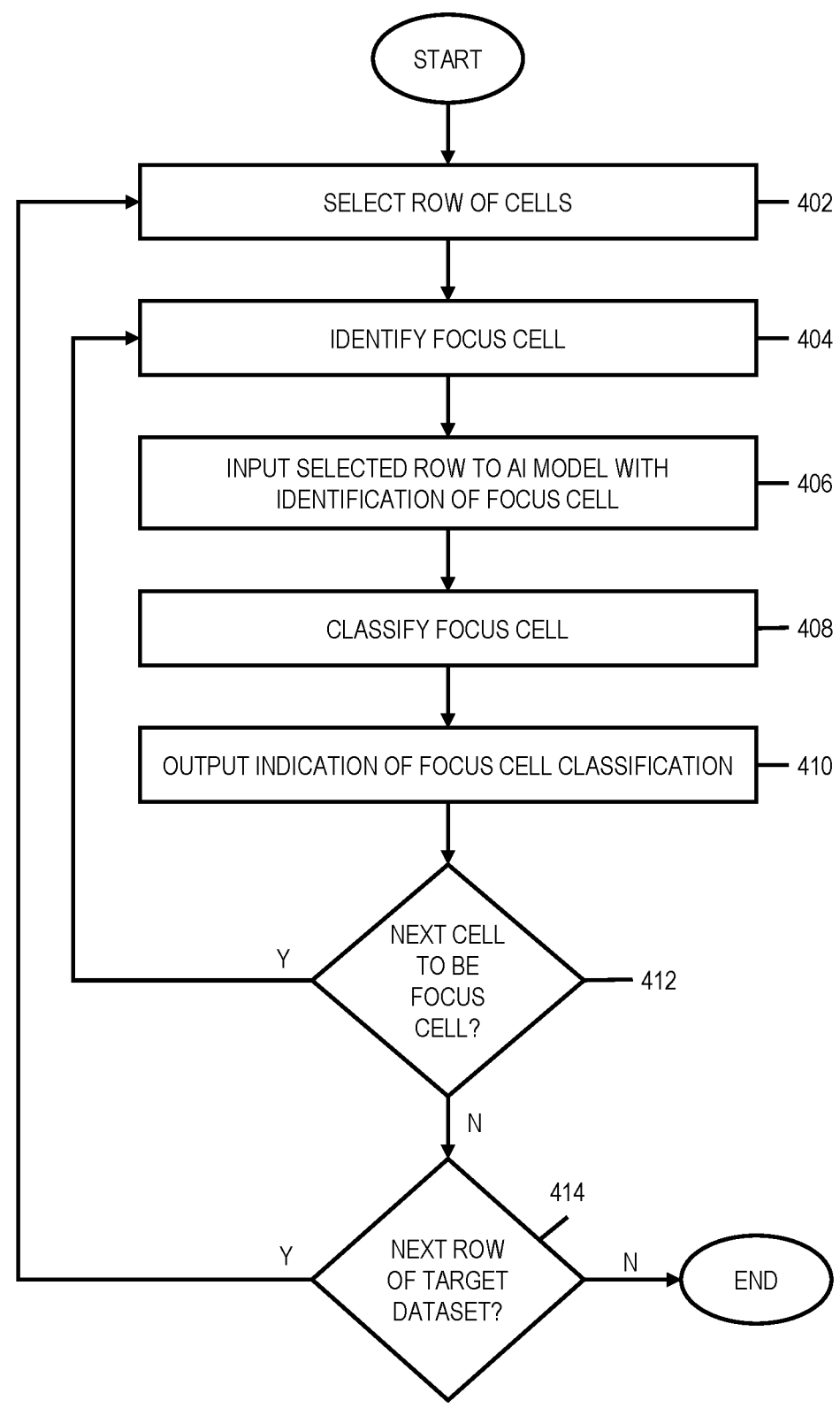
FIG. 4 depicts an example process for applying a trained artificial intelligence model to a target dataset to classify erroneous cells thereof, in accordance with aspects described herein.

FIG. 4 depicts an example process for applying a trained artificial intelligence model to a target dataset to classify erroneous cells thereof, in accordance with aspects described herein. In examples, the process is performed by one or more computer systems. The process enters into an outer loop by selecting (402) a row of cells of the target dataset. The process then enters into an inner loop by identifying (404) a cell, of that row, to be a focus cell. The process inputs (406) the selected row of cells to the AI model with an identification of a focus cell of the selected row of cells. The identified focus cell is the cell to be classified by the AI model on this iteration. The process proceeds by classifying (408), by the AI model, the focus cell to obtain a classification of the focus cell. The classifying identifies whether the focus cell is erroneous. The classifying could be a binary classification that classifies the focus cell as being either erroneous or not erroneous. Additionally or alternatively, the classifying could be a multi-classification that identifies whether the focus cell is erroneous and, if so, one or more errors of the focus cell.

In a specific embodiment, the selected row of cells is input as a string of cell data of a plurality of cells of the selected row of cells, where the plurality of cells includes the focus cell and the string of cell data includes the cell data of the focus cell. The identification of the focus cell could include an identification of the cell data of the focus cell within that string of cell data. The classifying the focus cell could therefore classify the provided cell data of the focus cell.

Accordingly, the process of FIG. 4 could include building the string of cell data of the plurality of cells. The building could use a delimiter between cell data of different cells of the selected row of cells, where the delimiter is inserted between cell data of different cells. The identification of the cell data of the focus cell could include insertion of a selected character into the string at one or more positions relative to the cell data of the focus cell (such as before and after the focus cell data), and the AI model can be configured to identify the focus cell by locating the inserted selected character.

Continuing with FIG. 4, the process outputs (410) an indication of the classification of the focus cell, for instance to a classification table or other target. The process continues by inquiring (412) whether there is a next cell of the selected row to be the next focus cell. If so, (412, Y), the process returns 404 to identify the next cell in the selected row to be the next focus cell. In this manner, aspects 404, 406, 408, and 410 of FIG. 4 can be iterated over one or more other cells of the selected row of cells. As a next iteration, the process identifies the next focus cell (at 404), for instance as the sequentially-next cell in the row from the current focus cell that was just classified. The selection of a next focus cell can be constrained to only cells of the row that were not already selected as the focus and classified. Also as part of the iteration, the process again inputs the selected row of cells (at 406) except that it now identifies the next focus cell, classifies that next focus cell (at 408) and outputs (at 410) an indication of the classification of that next focus cell. This iterating can repeat over each cell of the selected row of cells, for instance, then stop once each of the cells has been classified. Alternatively, the check at 412 could incorporate more sophisticated inquiries, for instance to incorporate a selection technique that might skip certain cells.

If at 412 it is determined that there is no next cell of the currently selected to be a next focus cell (412, N), the process proceeds by inquiring (414) whether there is a next row of the target dataset be the next selected row for cell classification. If so (414, Y), the process returns 402 to select a next row of cells to process. In this manner, aspects 404, 406, 408, and 410 of FIG. 4 can be iterated over one or more other row(s) of the target dataset to classify the cells in those row(s). As a next iteration, the process selects the next row of cells, for is for instance the sequentially-next row in the dataset. The selection of a next row can be constrained to only the rows that were not already selected at 402. The process then proceeds through 404, 406, 408, 410, and 412 as described above but with respect to this next selected row.

This iterating can repeat over each row of the target dataset, for instance, then stop once each of the rows has been selected and its cells classified. Alternatively, the check at 414 could incorporate more sophisticated inquiries, for instance to incorporate a selection technique that might skip certain rows.

Once the iteration through the rows of the target dataset has completed (414, N), the process ends.

In a particular example of using a trained AI model in accordance with aspects described herein, a process obtains a target dataset for classification by the AI model as to which cells of the target dataset are erroneous, selects a row of cells of the target dataset, and iteratively performs (i) inputting to the AI model the selected row of cells with an indication of a focus cell of the selected row of cells, and (ii) obtaining, based on the inputting, an indication of whether the indicated focus cell is erroneous based at least in part on cell values of other cells of the selected row of cells, wherein, at each iteration of the iteratively performing, a different cell of the selected row of cells is indicated as the focus cell. The process then repeats, for one or more other rows of cells of the target dataset, the selecting and the iteratively performing.

Figure 5:
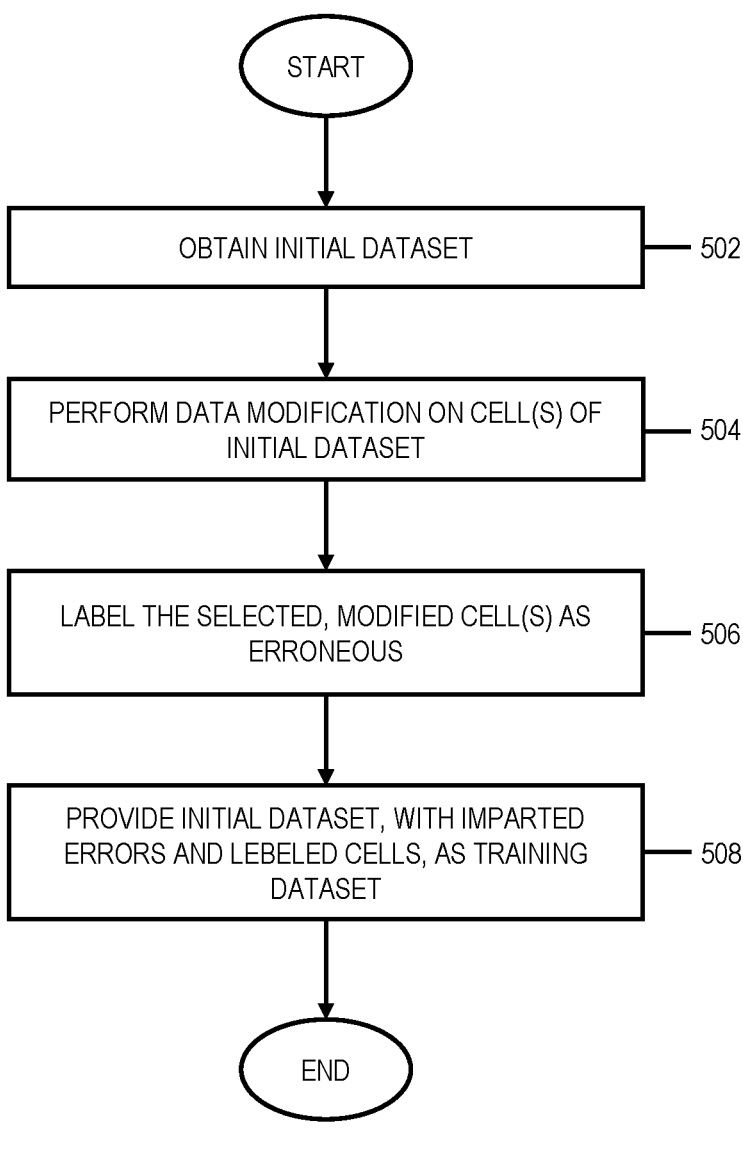
FIG. 5 depicts an example process for providing a training dataset, in accordance with aspects described herein.

FIG. 5 depicts an example process for providing a training dataset to train an AI model to classify cells of a dataset, in accordance with aspects described herein. In examples, the process is performed by one or more computer systems. The process obtains (502) an initial dataset and performs (504) data modification on selected data cells of the initial dataset to impart errors in the selected data cells. In embodiments, the data modification on a selected data cell of the initial dataset includes random character replacement, random character insertion, random character deletion, random character swapping, value deletion, column value swapping, and/or row value swapping. The data modification can impart in a selected data cell of the initial dataset at least one of the following errors, as examples: a typographical error, a value swap across columns error, a value violating data constraint error, a formatting error, and/or a missing value error.

Continuing with FIG. 5, the process labels (506) the selected cells as being erroneous. Then, based on performing the data modification and on the labeling, the process provides (508) the initial dataset, with the errors imparted in the selected data cells, as the training dataset.

The training dataset can then be used to build and train an AI model. In a particular example, a process builds the AI model configured to classify cells of a dataset, which building includes obtaining a training dataset and training the AI model using the training dataset, where the training includes (i) selecting a row of cells of the training dataset, (ii) iteratively performing, for each cell of a plurality of cells of the selected row of cells, inputting the row of cells to the AI model and indicating the cell as being a focus cell along with a label as to whether the focus cell is erroneous, and (iii) repeating the selecting and the iteratively performing for one or more other rows of cells of the training dataset. The training can provide labels to the AI model as to which cells are erroneous, and thus trains the AI model to classify a selected focus cell of an input row of cells as to whether the selected focus cell is erroneous based at least in part on cell values of other cells of the input row of cells.

Although various examples are provided, variations are possible without departing from a spirit of the claimed aspects.

Figure 6:
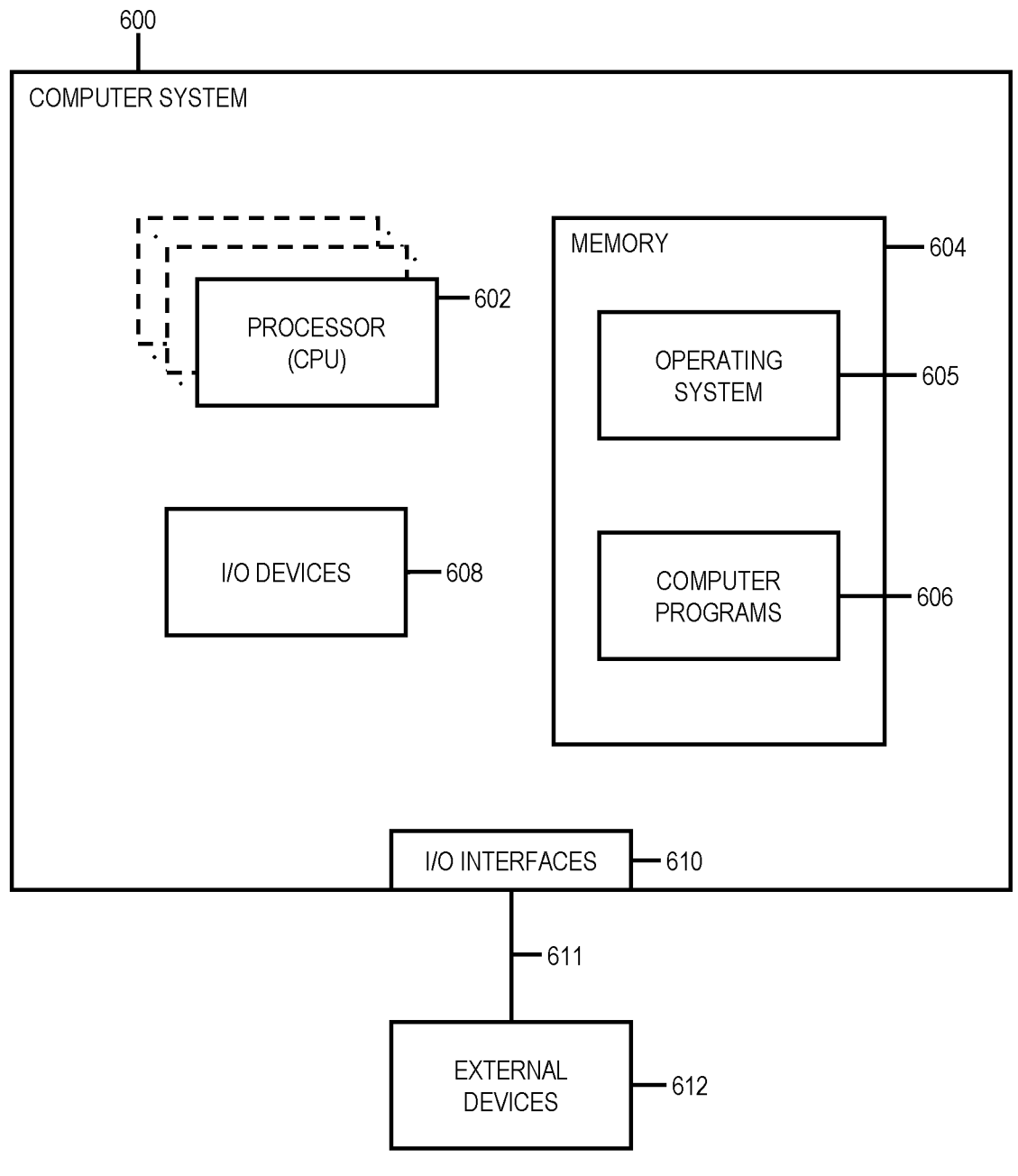
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

17

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
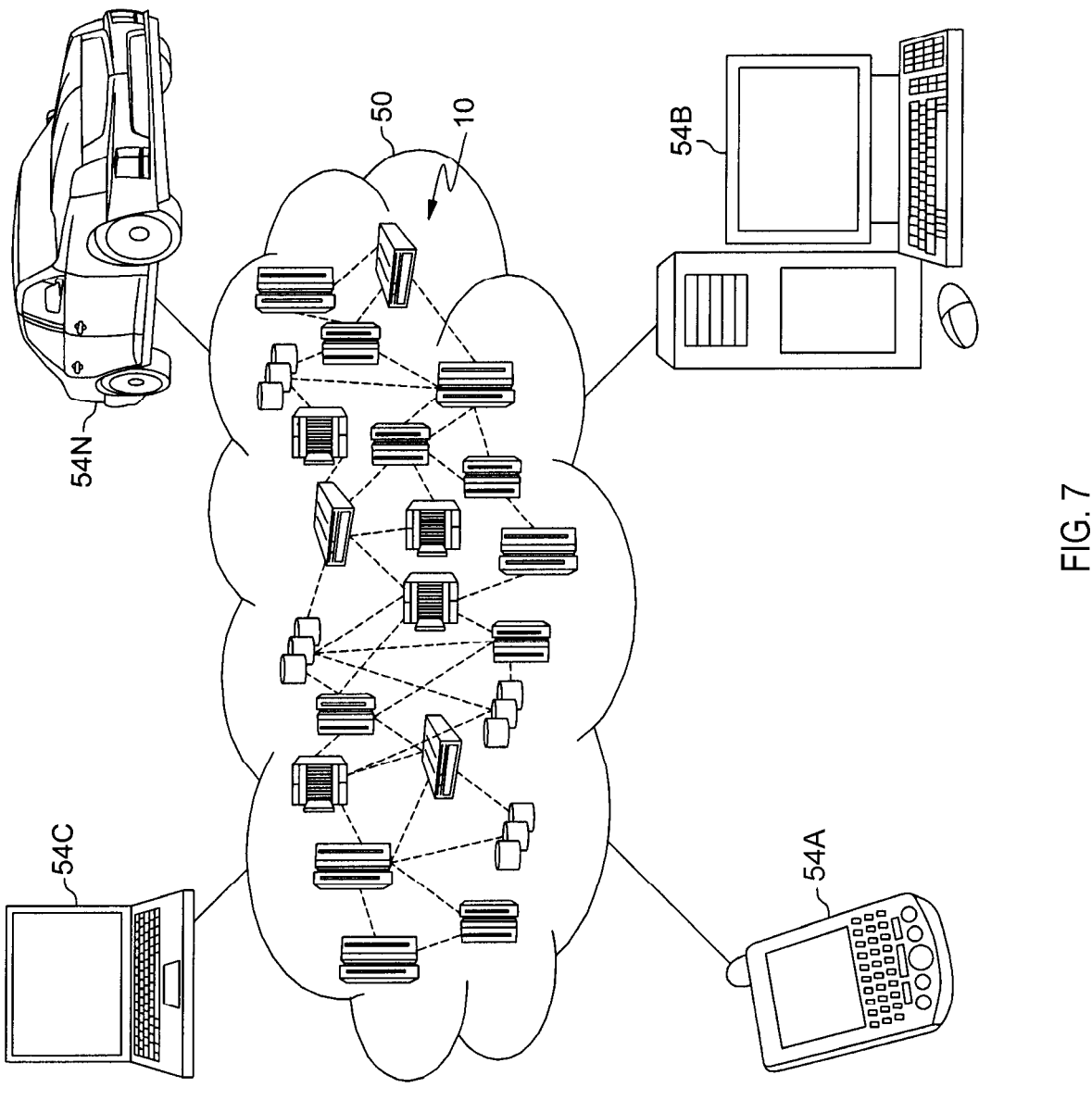
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
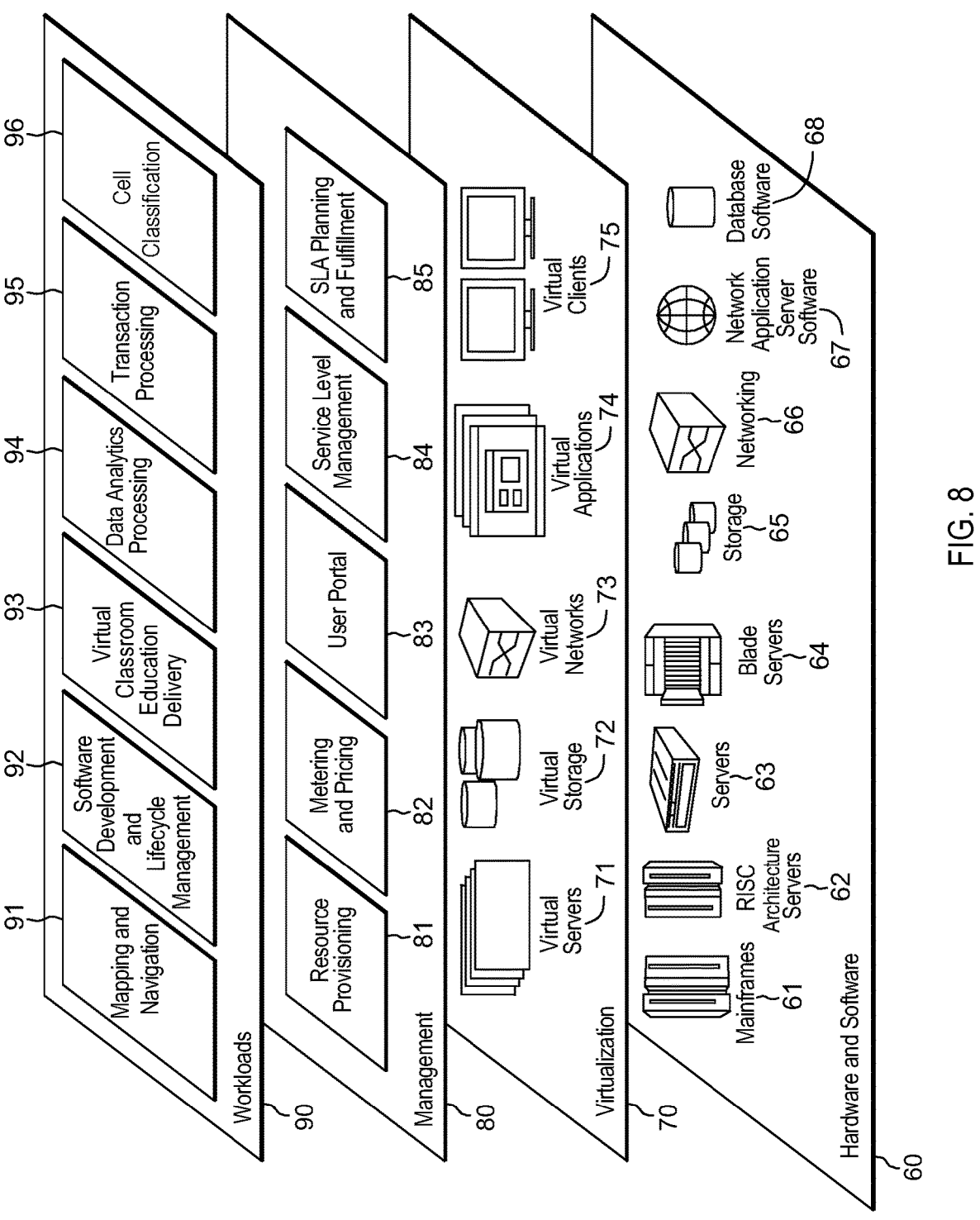
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cell classification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

performing data modification on selected data cells of an initial dataset, wherein the data modification imparts errors in the selected data cells;

labeling the selected data cells as being erroneous, wherein the data modification and the labeling provide a training dataset with the errors imparted in the selected data cells, training an artificial intelligence (AI) model using the training dataset to identify one or more relationships between cells of a row that inform a context of a selected focus cell of the row based at least in part on cells neighboring the selected focus cell, and classify whether the selected focus cell of the row is erroneous based at least in part on the identified one or more relationships and the informed context;

obtaining a target dataset, the target dataset comprising rows and columns of data cells, applying the AI model to the target dataset to identify one or more erroneous cells of the target dataset, the applying comprising:

selecting a row of cells of the target dataset;

inputting the selected row of cells to the AI model with an identification of a focus cell of the selected row of cells, the focus cell to be classified by the AI model, wherein the inputting comprises:

building a string of cell data of a plurality of cells of the selected row of cells, the plurality of cells comprising the focus cell, and the string of cell data of the plurality of cells comprising cell data of the focus cell wherein the building provides a delimiter in the string between cell data of different cells of the selected row of cells; and inputting to the AI model the string of cell data of the plurality of cells;

classifying, by the AI model, the focus cell to obtain a classification of the focus cell, the classifying identifying whether the focus cell is erroneous; and outputting an indication of the classification of the focus cell.

2. The method of claim 1, wherein the classifying comprises one selected from the group consisting of:

a binary classification that classifies the focus cell as being either erroneous or not erroneous; and a multi-classification that identifies whether the focus cell is erroneous and, if so, one or more errors of the focus cell.

3. The method of claim 1, wherein the identification of the focus cell comprises an identification of the cell data of the focus cell within the string of cell data of the plurality of cells, and wherein the classifying the focus cell classifies the cell data of the focus cell.

4. The method of claim 3, wherein the identification of the cell data of the focus cell comprises insertion of a selected character into the string at one or more positions relative to the cell data of the focus cell, wherein the AI model is configured to identify the focus cell by locating the inserted selected character.

5. The method of claim 1, wherein the applying further comprises:

iterating, over one or more other cells of the selected row of cells, the inputting the selected row of cells, the classifying the focus cell, and the outputting an indication of the classification of the focus cell, wherein, at each iteration of the iterating, the applying:

identifies a next focus cell of the selected row of cells, the next focus cell being a different cell than each prior-identified and classified focus cell of the selected row of cells;

inputs the selected row of cells to the AI model with an identification of the next focus cell, the next focus cell to be classified by the AI model;

classifies the next focus cell to obtain a classification of the next focus cell, the classifying identifying whether the focus cell is erroneous; and outputs an indication of the classification of the next focus cell.

6. The method of claim 5, wherein the applying further comprises iterating, over one or more other rows of the target dataset:

the selecting a row of cells;

the inputting the selected row of cells to the AI model with an identification of a focus cell;

the classifying the focus cell;

the outputting an indication of the classification of the focus cell; and the iterating, over one or more other cells of the selected row of cells, the inputting the selected row of cells, the classifying the focus cell, and the outputting an indication of the classification of the focus cell, wherein at each iteration of the iterating over the one or more other rows of the target dataset, the applying identifies a next row of cells of the target dataset, the next row of cells being a different row of cells than each prior-selected row of cells, and wherein the identified next row of cells is the selected row of cells.

7. The method of claim 1, wherein the AI model is trained to identify the one or more relationships by way of a multi-head attention component that comprises a plurality of attention heads, and wherein the AI model is configured to classify the focus cell based at least in part on the informed context.

8. The method of claim 1, wherein the AI model comprises:

a plurality of encoder layers, each encoder layer of the plurality of encoder layers comprising a respective at least one attention layer and a feed-forward layer; and a perceptron layer comprising an activation function configured to provide the output classification of the focus cell.

9. The method of claim 1, wherein the training dataset comprises at least the selected data cells labeled as erroneous and at least some cells labeled as correct.

10. The method of claim 9, wherein the training dataset is based on a first proper subset of a larger dataset and wherein the target dataset is a second proper subset of that larger dataset, the second proper subset being different from the first proper subset.

11. The method of claim 1, wherein the data modification on a selected data cell of the initial dataset comprises at least one selected from the group consisting of: random character replacement, random character insertion, random character deletion, random character swapping, value deletion, column value swapping, and row value swapping.

12. The method of claim 1, wherein the data modification imparts in a selected data cell of the initial dataset at least one error selected from the group consisting of: a typographical error, a value swap across columns error, a value violating data constraint error, a formatting error, and a missing value error.

13. The method of claim 1, further comprising performing automatic processing, the automatic processing comprising raising an electronic alert to a user that indicates one or more erroneous cells of the target dataset.

14. A computer system comprising:

a memory; and a processor in communication with the memory, wherein the computer system is configured to perform a method comprising:

performing data modification on selected data cells of an initial dataset, wherein the data modification imparts errors in the selected data cells;

labeling the selected data cells as being erroneous, wherein the data modification and the labeling provide a training dataset with the errors imparted in the selected data cells;

training an artificial intelligence (AI) model using the training dataset to identify one or more relationships between cells of a row that inform a context of a selected focus cell of the row based at least in part on cells neighboring the selected focus cell, and classify whether the selected focus cell of the row is erroneous based at least in part on the identified one or more relationships and the informed context;

obtaining a target dataset, the target dataset comprising rows and columns of data cells;

applying the AI model to the target dataset to identify one or more erroneous cells of the target dataset, the applying comprising:

selecting a row of cells of the target dataset;

inputting the selected row of cells to the AI model with an identification of a focus cell of the selected row of cells, the focus cell to be classified by the AI model, wherein the inputting comprises:

building a string of cell data of a plurality of cells of the selected row of cells, the plurality of cells comprising the focus cell, and the string of cell data of the plurality of cells comprising cell data of the focus cell, wherein the building provides a delimiter in the string between cell data of different cells of the selected row of cells; and inputting to the AI model the string of cell data of the plurality of cells;

classifying, by the AI model, the focus cell to obtain a classification of the focus cell, the classifying identifying whether the focus cell is erroneous; and outputting an indication of the classification of the focus cell.

15. The computer system of claim 14, wherein the identification of the focus cell comprises an identification of the cell data of the focus cell within the string of cell data of the plurality of cells, wherein the identification of the cell data of the focus cell comprises insertion of a selected character into the string at one or more positions relative to the cell data of the focus cell, wherein the AI model is configured to identify the focus cell by locating the inserted selected character, and wherein the classifying the focus cell classifies the cell data of the focus cell.

16. The computer system of claim 14, wherein the AI model is trained to identify the one or more relationships by way of a multi-head attention component that comprises a plurality of attention heads, and wherein the AI model is configured to classify the focus cell based at least in part on the informed context.

17. The computer system of claim 14, wherein the training dataset comprises at least the selected data cells labeled as erroneous and at least some cells labeled as correct, wherein the training dataset is based on a first proper subset of a larger dataset and wherein the target dataset is a second proper subset of that larger dataset, the second proper subset being different from the first proper subset.

18. A computer program product comprising:
a computer readable storage medium readable by a processing circuit and storing instructions for execution by the processing circuit for performing a method comprising:
performing data modification on selected data cells of an initial dataset, wherein the data modification imparts errors in the selected data cells;
labeling the selected data cells as being erroneous, wherein the data modification and the labeling provide a training dataset with the errors imparted in the selected data cells;
training an artificial intelligence (AI) model using the training dataset to identify one or more relationships between cells of a row that inform a context of a selected focus cell of the row based at least in part on cells neighboring the selected focus cell, and classify whether the selected focus cell of the row is erroneous based at least in part on the identified one or more relationships and the informed context;
obtaining a target dataset, the target dataset comprising rows and columns of data cells;
applying the AI model to the target dataset to identify one or more erroneous cells of the target dataset, the applying comprising:
selecting a row of cells of the target dataset;
inputting the selected row of cells to the AI model with an identification of a focus cell of the selected row of cells, the focus cell to be classified by the AI model, wherein the inputting comprises:
building a string of cell data of a plurality of cells of the selected row of cells, the plurality of cells comprising the focus cell, and the string of cell data of the plurality of cells comprising cell data of the focus cell, wherein the building provides a delimiter in the string between cell data of different cells of the selected row of cells; and
inputting to the AI model the string of cell data of the plurality of cells;
classifying, by the AI model, the focus cell to obtain a classification of the focus cell, the classifying identifying whether the focus cell is erroneous; and
outputting an indication of the classification of the focus cell.

19. The computer program product of claim 18, wherein the AI model is trained to identify the one or more relationships by way of a multi-head attention component that comprises a plurality of attention heads, and wherein the AI model is configured to classify the focus cell based at least in part on the informed context.

20. The computer program product of claim 18, wherein the training dataset comprises at least the selected data cells labeled as erroneous and at least some cells labeled as correct, wherein the training dataset is based on a first proper subset of a larger dataset and wherein the target dataset is a second proper subset of that larger dataset, the second proper subset being different from the first proper subset.

* * * * *